(12) United States Patent
Buchmayer et al.

(10) Patent No.: US 10,178,564 B2
(45) Date of Patent: Jan. 8, 2019

(54) TECHNIQUE FOR HANDLING A COMMUNICATION FAILURE IN A SPECTRUM SHARING COMMUNICATION SYSTEM

(71) Applicant: Telefonaktiebolaget LM Ericsson (publ), Stockholm (SE)

(72) Inventors: Mats Buchmayer, Stockholm (SE); Håkan Persson, Solna (SE); William Warrillow, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 15/511,054

(22) PCT Filed: Sep. 21, 2015

(86) PCT No.: PCT/EP2015/071582
§ 371 (c)(1),
(2) Date: Mar. 14, 2017

(87) PCT Pub. No.: WO2016/046122
PCT Pub. Date: Mar. 31, 2016

(65) Prior Publication Data
US 2017/0251386 A1    Aug. 31, 2017

Related U.S. Application Data

(60) Provisional application No. 62/053,268, filed on Sep. 22, 2014.

(51) Int. Cl.
*H04W 24/04* (2009.01)
*H04W 16/14* (2009.01)
(Continued)

(52) U.S. Cl.
CPC ......... *H04W 24/04* (2013.01); *G06F 11/0709* (2013.01); *G06F 11/0757* (2013.01);
(Continued)

(58) Field of Classification Search
CPC ... H04W 24/04; H04W 16/14; H04W 76/027; H04W 76/045; H04W 76/18;
(Continued)

(56) References Cited

U.S. PATENT DOCUMENTS

2012/0177042 A1* 7/2012 Berman ............... H04L 12/4625
370/392
2014/0032960 A1* 1/2014 Konishi .............. G06F 11/1456
714/6.3

(Continued)

OTHER PUBLICATIONS

Chen et al. "Protocol to Access White-Space (PAWS) Databases draft-ietf-paws-protocol-17"; XP015101524; Internet Engineering Task force, IETF; Standardworkingdraft; Internet Society (ISOC) 4; Sep. 8, 2014, pp. 1-91; Geneva, Switzerland.

(Continued)

*Primary Examiner* — Faisal Choudhury
(74) *Attorney, Agent, or Firm* — Sage Patent Group

(57) ABSTRACT

An approach for enhancing service continuity in the case of a communication failure between a repository and a controller of a spectrum sharing communication system as described. The repository is operable to at least one of store and generate restrictions governing use of a set of spectrum resources, and the controller is operable to receive the restriction from the repository and to enforce the restrictions A method implementation performed, for example, by the controller may comprise determining occurrence of a communication failure between the repository and the controller and, in response to the communication failure, taking one or
(Continued)

more actions that result in an at least temporary continued use of spectrum resources under control of the controller.

37 Claims, 3 Drawing Sheets

(51) Int. Cl.
  *G06F 11/07* (2006.01)
  *H04L 12/24* (2006.01)
  *H04L 12/26* (2006.01)
  *H04W 76/18* (2018.01)
  *H04W 76/25* (2018.01)
  *H04L 1/00* (2006.01)

(52) U.S. Cl.
  CPC .......... *H04L 41/0654* (2013.01); *H04L 43/10* (2013.01); *H04W 16/14* (2013.01); *H04W 76/18* (2018.02); *H04W 76/25* (2018.02)

(58) Field of Classification Search
  CPC .... H04W 76/25; H04L 43/10; H04L 41/0654; G06F 11/0709; G06F 11/0757
  USPC .......................................................... 370/216
  See application file for complete search history.

(56) References Cited

U.S. PATENT DOCUMENTS

| | | | | |
|---|---|---|---|---|
| 2015/0351148 | A1* | 12/2015 | Jha ...................... | H04W 76/028 455/436 |
| 2016/0149801 | A1* | 5/2016 | Morosan ................. | H04L 45/22 370/228 |
| 2016/0277937 | A1* | 9/2016 | Yilmaz ................. | H04W 16/14 |

OTHER PUBLICATIONS

Nokia Networks; "Motivation for a New SI: RAN support for Licensed Shared Access (LSA)"; 3GPP TSG-RAN meeting #65; RP-141353; Sep. 9-12, 2014; pp. 1-5; 3rd Generation Partnership Project; Sophia-Antipolis Cedex, France.

Nokia Networks;"New Study Item on RAN support for Licensed Shared Access (LSA)"; 3GPP TSG RAN Meeting #65; RP-141351; Sep. 9-12, 2014; pp. 1-6; 3rd Genration Partnership Project; Sophia-Antipolis Cedex, France.

\* cited by examiner

TECHNIQUE FOR HANDLING A COMMUNICATION FAILURE IN A SPECTRUM SHARING COMMUNICATION SYSTEM

TECHNICAL FIELD

The present disclosure generally relates to a spectrum sharing communication system. In particular, a technique for handling a communication failure in such a system is described (e.g., by communicating a safe mode fallback plan and/or for enhancing service continuity). The technique may be implemented in the form of methods, computer programs, devices and systems.

BACKGROUND

Wireless, radio or cellular technologies (GERAN, UTRAN, E-UTRAN, WiFi, etc.) require spectrum resources to establish communication. Spectrum is fundamental to the success of mobile wireless communications, and mobile operators often rely on an exclusive license as a key asset ensuring predictable service as well as business fundamentals.

The range of spectrum that is made available for mobile communication has increased over the years, but despite this the demand for new spectrum still exceeds the available exclusive spectrum. The scarcity of spectrum has created a need for new methods to assign spectrum resources and sharing licensed spectrum with other operations.

One framework to address the sharing of spectrum is Licensed Sharing Access (LSA), also sometime referred to as Authorized Shared Access (ASA) or Spectrum Access System (SAS). Within this framework it would be feasible for an operator or other licensee to use spectrum that is partly utilized already by other users/applications. The entity or service operator that operates the application is called incumbent. The incumbent could operate applications like Radar, Fixed Satellite System or the like, but the applications could also include more ad hoc applications like Programme Making and Special Events (PMSE).

The ASA/LSA/SAS schemes define spectrum resource and sharing rules that may be manifested into exclusion/protection zones. The users sharing the spectrum with, for example, the incumbent users need to adhere to those rules. The rules may be changed/updated during the life-time of a sharing agreement. The spectrum resource and sharing rules are typically exchanged over an interface between the relevant parties.

A basic framework to handle sharing of spectrum and interference between applications has been defined in IETF Protocol to Access White-Space Databases (PAWS). The framework of LSA, however, extends beyond the capabilities in IETF PAWS.

Standardization of an LSA framework and related interfaces are ongoing in the ETSI Reconfigurable Radio Systems (RRS) project. In parallel, the Federal Communication Commission (FCC) in the US is defining the regulatory framework for use of 3.5 GHz spectrum as a step in the President's Council of Advisors on Science and Technology (PCAST) recommendations to identify 1000 MHz of federal spectrum to create "the first shared use spectrum superhighways."

In ETSI, the standard has defined an LSA system comprising a so-called LSA Repository (LR) and a so-called LSA Controller (LC). The LSA Repository hosts the functions to input, store and process data from a regulator and one or more incumbents. After processing the available spectrum resources and the restrictions set up by regulator and incumbent, the LSA Repository will communicate the restrictions to the LSA Controller either as part of an Availability Request procedure (LSA Controller Request information, pull procedure) or Availability Notification procedure (LSA Repository pushes information to the LSA Controller)

The exchange of information is required for the LSA Controller to manage the cell configuration within a cellular network, i.e., either activate or de-activate a cell, modify cell parameters, e.g., output power, or other changes required in the cellular network to comply with regulations and incumbent protection requirements.

The communication between LSA Repository and LSA Controller over an interface, $LSA_1$ assumes a persistent connection that allows for continuous communications to ensure that the LSA Controller has up-to-date information. For verification that the interface is up and running, different techniques can be used (e.g., heartbeat or similar techniques). However, there is no means available to ensure that the communication over $LSA_1$ will never fail. And the higher the availability requirements, the more the cost increases.

In this case the only default fallback that ensures compliance to the regulatory and incumbent restrictions is to de-activate the cells that are sharing spectrum since it is not possible to know if the LSA Controller is up-to-date. This approach would potentially impact the service provided by an operator, resulting in service degradation since it may need to stop using these frequencies.

SUMMARY

There is a need for a technique that enhances service continuity in the case of a communication failure between a repository and a controller of a spectrum sharing communication system.

According to a first aspect, a method for enhancing service continuity in case of a communication failure between a repository and a controller of a spectrum sharing communication system is provided, wherein the repository is operable to at least one of store and generate restrictions governing use of a set of shared spectrum resources and the controller is operable to receive the restrictions from the repository and enforce the restrictions. The method comprises determining occurrence of a communication failure between the repository and the controller and, in response to the communication failure, taking one or more actions that result in an at least temporary continued use of spectrum resources under control of the controller.

The spectrum resources may be used by a cell providing the service that is to be continued. As such, the at least temporary continued use of the spectrum resources may comprise maintaining the cell providing the service at least temporarily active by the controller (e.g., in accordance with the last known use restrictions). For example, the cell may not be de-activated or otherwise be effected in a way that would lead to a discontinuation of the service provided by the cell.

The one or more actions may relate to an assignment of the spectrum resources for use on a permanent basis. For example, the spectrum resources may be permanently used until the communication failure is no longer present (e.g., until it is determined that the communication failure no longer occurs). If occurrence of the communication failure is no longer determined, usage of the spectrum resources may continue as scheduled (e.g., in accordance with the scheduled use restrictions). Alternatively, or in addition, the permanent use of the spectrum resources may end only upon a dedicated operator intervention. On the other hand, in the absence of such intervention and as long as the communication failure is still occurring, the spectrum resources may permanently be used.

In certain implementations the one or more actions may include providing a timer that allows for a failure recovery hysteresis before stopping usage of the spectrum resources. For example, usage of the spectrum resources may only be stopped in case occurrence of the communication failure is still determined upon expiry of the timer. If, on the other hand, occurrence of the communication failure is no longer determined upon timer expiry, usage of the spectrum resources may continue as scheduled (e.g., in accordance with the scheduled use restrictions).

Stopping usage of the spectrum resources may comprise de-activating one or more cells providing the service. De-activation of a particular cell may encompass de-activation of the corresponding service provided by the cell. De-activation of a particular cell may additionally, or alternatively, comprise stopping usage of shared frequencies or other shared spectrum resources.

The one or more actions may include a power reduction. The power reduction may, for example, relate to a transmit power of one or more cells providing the service. The power reduction may be performed stepwise or continuously. The power reduction may be performed over an extended period of time (e.g., as defined in the associated one or more actions).

The one or more actions may only be taken in case the communication failure lasts more than a threshold amount of time. The threshold amount of time may be defined by a timer (e.g., the hysteresis timer mentioned above). On the other hand, if the communication failure ends before the threshold amount of time, the one or more actions may not be taken. Rather, usage of the spectrum resources may continue as scheduled (e.g., in accordance with the scheduled use restrictions).

The one or more actions may be entered as configuration information in the controller. As an example, the one or more actions may be entered in an action database maintained by the controller.

The one or more actions may be passed by a message from the repository to the controller. Alternatively, or in addition, the one or more actions may be provided as an operator setting to the controller.

The one or more actions may be defined as part of a sharing framework. The sharing framework may be compliant to one or more of ASA, LSA, SAS and any FCC framework.

The method according to the first aspect may be performed by the controller of the spectrum sharing communication system. The controller may take the form of an LSA Controller in accordance with the ETSI standard(s).

In one implementation, the one or more actions are defined in a safe mode fallback plan received from the repository. In one variant, the safe mode fallback plan is pulled by the controller from the repository. In an alternative variant, the safe mode fallback plan is pushed by the repository to the controller.

The actions in the safe mode fallback plan may be valid for a certain period of time. This validity period may be defined in the safe mode fallback plan. The validity period may be defined as a relative period (e.g., starting with determining occurrence of the communication failure and, optionally, enforced by a timer at the controller) or as an absolute period (e.g., in terms of a specific date or other point in time). At the end of the validity period (e.g., upon time expiry), usage of the spectrum resources may be stopped.

The communication failure may be a failure of a communication interface between the repository and the controller. In exemplary variants, the communication interface may be the $LSA_1$ interface.

In certain implementations, the occurrence of the failure may be determined using a heartbeat procedure. The heartbeat procedure may comprise the monitoring of the reception of heartbeat messages (e.g., so-called "pings") in regular time intervals.

According to a second aspect, a method for enhancing service continuity in the case of a communication failure between a repository and a controller of a spectrum sharing communication system is provided, wherein the repository is operable to at least one of store and generate restrictions governing use of a set of shared spectrum resources and a controller is operable to receive the restrictions from the repository and enforce the restrictions. The method comprises providing one or more actions that result in an at least temporary continued use of spectrum resources under control of the controller upon occurrence of a communication failure between the repository and the controller, and communicating the one or more actions to the controller.

The method according to the second aspect may be performed by the repository. The repository may be an LSA Repository according to the ETSI standard(s).

The one or more actions may be communicated to the controller in a safe mode fallback plan. In one variant, the safe mode fallback plan is pulled by the controller. In an alternative variant, the safe mode fallback plan is pushed to the controller.

Also provided are computer-readable instructions, that, when executed on one or more processors, configure the one or more processors to perform a method according to any of the method aspects presented herein. The computer-readable instructions may be stored on a computer-readable medium, such as a hard-disk, semiconductor memory, and so on. The computer-readable instructions may also be provided for download via a wireless or wired network connection.

Also provided is a controller for enhancing service continuity in the case of a communication failure between a repository and the controller in a spectrum-sharing communication system. The controller is operable to receive from the repository restrictions governing use of a set of shared spectrum resources and to enforce the restrictions. The controller comprises one or more processors and a computer-readable medium storing instructions that, when executed by the one or more processors, cause the controller to implement the following operations: determining occurrence of a communication failure between the repository and the controller and, in response to the communication failure, taking one or more actions that result in an at least temporary continued use of spectrum resources under control of the controller.

The controller may be configured to perform any of the methods and method aspects presented herein.

Also provided is a repository for enhancing service continuity in the case of a communication failure between the repository and a controller in a spectrum-sharing communication system, wherein the repository is operable to at least one of store and generate restrictions governing use of a set of shared spectrum resources for enforcement by the controller. The repository comprises one or more processors and a computer-readable medium storing instructions that, when executed by the one or more processors, cause the repository to implement the following operations: providing one or more actions that result in an at least temporary continued use of spectrum resources under control of the controller upon occurrence of a communication failure between the repository and the controller, and communicating the one or more actions to the controller.

The repository may be configured to perform any of the methods and method aspects presented herein.

Also presented is a spectrum sharing communication system comprising the controller and the repository presented herein. The spectrum sharing communication system may further comprise an interface for enabling communication between the controller and the repository. The interface may, for example, be implemented as dedicated interface components provided at the side of each of controller and the repository, respectively.

BRIEF DESCRIPTION OF THE DRAWINGS

Further details of the technique presented herein are described with reference to the enclosed drawings, wherein.

DETAILED DESCRIPTION

In the following description, for purposes of explanation and not limitation, specific details are set forth, such as a specific spectrum sharing environment, in order to provide a thorough understanding of the technique disclosed herein. It will be apparent to one skilled in the art that the present technique may be practiced in other examples that depart from these specific details. For example, while the following examples are primarily described in connection with the LSA framework in accordance with the ETSI standard(s), it will appreciated that the technique described herein may also be implemented in connection with any other spectrum sharing communication system, such as an FCC regulatory framework for use of the 3.5 GHz or other spectrum.

Moreover, those skilled in the art will appreciate that the services, functions and steps explained herein may be implemented using software functioning in conjunction with at least one programmed processor, an Application Specific Integrated Circuit (ASIC), a Field Programmable Gate Array (FPGA), a Digital Signal Processor (DSP) or general purpose computer (including, for example, an Advanced Risc Machine, ARM). It will also be appreciated that while the following examples will primarily be described in the context of methods and devices, the present disclosure may also be embodied in software (i.e., computer-readable instructions) as well as in a system comprising at least one processor and memory coupled to the processor, wherein the memory is encoded with software that triggers execution of the services, functions and steps by the processor. It will further be appreciated that the services, functions and steps explained herein may be distributed over cloud computing resources.

Figure 1:
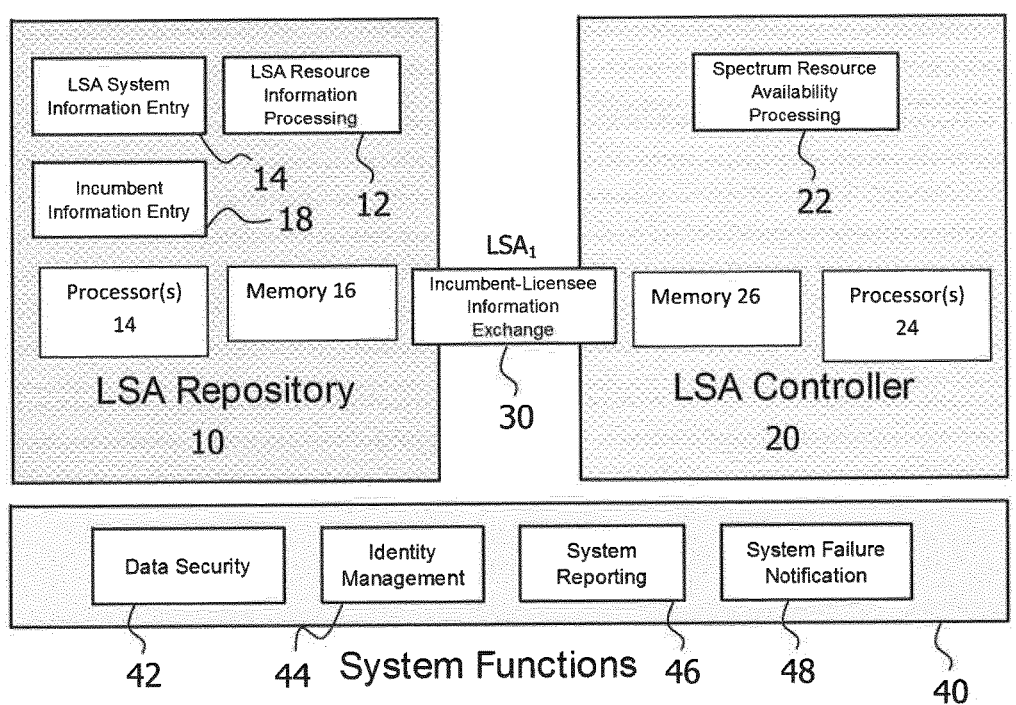
FIG. 1 shows an example of a spectrum sharing communication system comprising an LSA Repository and an LSA Controller in accordance with the present disclosure.

In an exemplary ETSI configuration according to the present disclosure, the framework to support Licensed Shared Access (LSA) includes two logical entities, the LSA Repository (LR) 10 and the LSA Controller (LC) 20, depicted in FIG. 1.

These logical entities 10, 20 communicate via an interface, $LSA_1$, in FIG. 1 depicted as the Incumbent-Licensee Information Exchange function 30.

A Spectrum Resource Availability Processing function 22 of the LC 20 is responsible for enforcing the regulatory and incumbent restrictions provided for a specific set of spectrum resources. This may comprise, and is not be limited to, one or more of:

Receiving LSA Spectrum Resource definition and related sharing rules and initiating respective measures in, for example, a Mobile/Fixed Communication Network (MFCN)
  Receiving and acknowledging LSA Spectrum Resource availability and initiating respective measures for available/not available in the MFCN
  Monitoring initiated measures for available/not available in the MFCN, generating acknowledgements when measures for available/not available in the MFCN are processed successfully A LSA Resource Information Processing function 12 of the LR 10 is to support the processing of incumbent input data. This processing may comprise, and is not restricted to, one or more of:

storing a persistent set a data describing the sharing framework and sharing arrangement(s).
  verifying data, checking consistency with sharing framework/arrangement
  processing LSA Spectrum Resource availability and initiating the forwarding of this information to the LSA Licensee
  monitoring expiry information of the Sharing Framework, the LSA License (individual right-to-use), and Sharing Arrangement and initiating defined measures (e.g., termination) of the spectrum sharing in case of expiry and informing the affected parties
  receiving acknowledgements for LSA Spectrum Resource availability (available/not available)
  support for multiple Incumbents and multiple LSA Licensees
  support of scheduled and on-demand modes of operation It is the responsibility of the LSA Resource Information Processing function 12 to monitor the expiry information of the Sharing Framework, but on the other hand it is the responsibility of the LC 20 to enforce the regulatory and incumbent restrictions. Persistent communication and data exchange via $LSA_1$ 30 facilitate the fulfillment of these responsibilities.

As shown in FIG. 1, each of the LR 10 and LC 20 includes one or more processors 14, 24 and a computer-readable medium 16, 26, e.g., a memory, storing instructions. The instructions stored in the LR memory 16, when executed by the one or more processors 14 of the LR 10, cause the LR 10 to implement the LSA Resource Information Processing function 12, an LSA System Information Entry function 18, an Incumbent Information Entry function 19, and any other operations necessary to carry out the functions of the LR 10 described herein. Similarly, the instructions stored in the LC memory 26, when executed by the one or more processors 24 of the LC 20, cause the LC 20 to implement the Spectrum Resource Processing function 22 and any other operations necessary to carry out the functions of the LC 20 described herein. Since the LR 10 and the LC 20 are logical entities, the associated hardware components of each entity 10, 20 (e.g., the processors 14, 24 and memories 16, 26) can be distributed over one or more network nodes and/or realized by cloud computing resources.

As further illustrated in FIG. 1, the LSA framework also comprises a plurality of system functions 40. The system functions 40 include a Data Security function 42, an Identity Management function 44, a System Reporting function 46 as well as a System Failure Notification function 48. The system functions 40 may be jointly used or provided to/by the LR 10 and the LC 20.

In one example that may be combined with other examples presented herein, in particular the LSA framework illustrated in FIG. 1 and the processes described with reference to the flowcharts in FIGS. 2 to 4, the proposed solution will allow for a fallback plan or fallback scenario that does not necessarily result in deactivation of all cells in case of a communication failure between a repository and a controller, such as the LR 10 and the LC 20, respectively. As such, the proposed solution may be performed in a spectrum sharing communication system comprising the LR 10 and the LC 20 coupled via an interface 30 as illustrated in FIG. 1.

One benefit of having a fallback plan that does not de-activate cells is greater service continuity. For example, even if the cells are covered by an overlay network (primary cells) there is no guarantee that this overlay network can efficiently handle the requested capacity needs, resulting in service degradation.

Therefore, to avoid a full de-activation of sharing cells at communication failure, the safe mode fallback plan may be communicated for use in response to the occurrence of a communication failure.

The safe mode fallback plan may be communicated as a set of rules valid for a certain time period that may be, for example, infinity. The rules may include rules for use of resources (frequency/frequencies, cell-site, cell, geographical area) that are assigned on a permanent basis, a reduction in power to be used in case of failure, and/or provision of a timer that may allow for a certain recovery hysteresis before de-activation of cells. It may be possible that there could be more than one set of rules each set having a different timer value enabling a step-wise reduction of the allowed usable frequencies, sites, geographical region, and/or cells. In one example, the rules may be updated at any time.

In one example it is assumed that a heartbeat procedure exists thereby enabling the two entities 10, 20 in FIG. 1 to know that the other is alive. Persistent failure of the heartbeat procedure should lead the LC 20 to activate a safe mode. In one example, the safe mode is not activated for transient errors, e.g., errors lasting less than a threshold amount of time.

What actions to take when entering safe mode should be agreed upon as part of the sharing framework that is agreed upon when the MFCN buys a license to use LSA. These actions can be entered as configuration information into the LC 20 or can be passed by message from the LR 10 to the LC 20.

Figure 2:
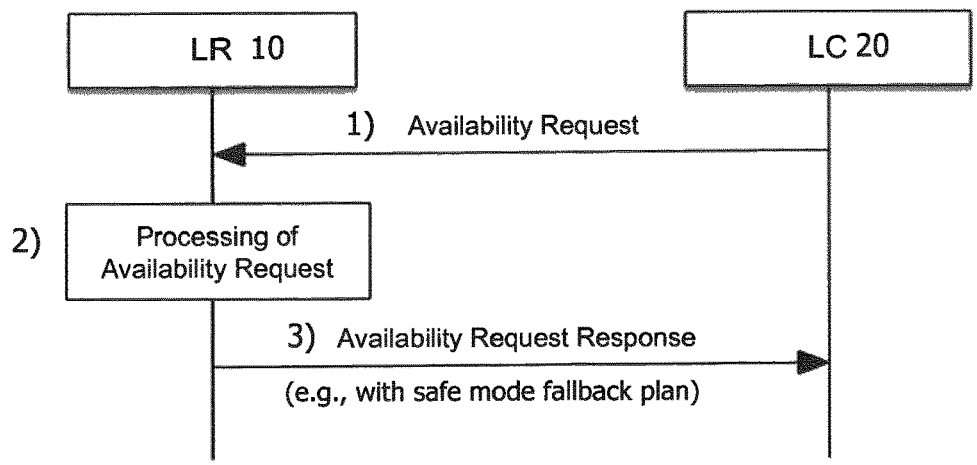
FIG. 2 shows an exemplary flowchart for the communication of actions to be taken in the case of a communication failure, the communication being performed in connection with an Availability Request procedure.

In one example method for exchanging the safe mode rules, e.g., rules for a timer and/or stepwise reduction of power, usable frequencies, sites and/or cells, geographical area (allowed or disallowed), the safe mode rules are exchanged as part of the Availability Request Procedure as illustrated in FIG. 2.

The Availability Request Procedure may comprise the following steps:
1. LC 20 sends an availability request message to a registered LR 10 requesting spectrum resource availability information.
2. The LR 10 checks that the resource request is consistent with the stored sharing framework and sharing arrangement related to the LC 20 and generates the spectrum resource availability information for the resource request.
3. The LR 10 sends an availability request response message including the current spectrum resource availability information, such as spectrum, geographical area and timing restrictions.

As part of step 3 in the above signaling steps, the rules for safe mode handling may be addressed (e.g., communicated).

Figure 3:
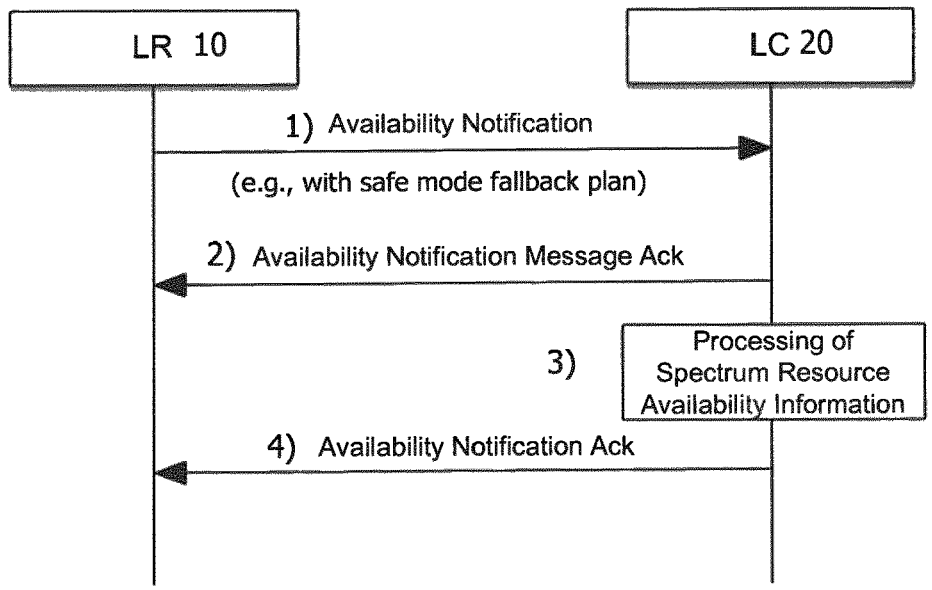
FIG. 3 shows an exemplary flowchart for the communication of actions to be taken in the case of a communication failure, the communication being performed in connection with an Availability Notification procedure.

In an alternative method for exchanging the safe mode rules (e.g., such as rules for a timer and/or step wise reduction of power, usable frequencies, sites and/or cells), the safe mode rules are exchanged as part of the Availability Notification Procedure as illustrated in FIG. 3.

The Availability Notification Procedure may comprise the following steps:
1. The LR 10 sends an availability notification message to the LC 20 including an updated set of spectrum resource availability information. The information may include notifications for immediate action as well as delayed or periodic action.
2. The LC 20 responds with an Acknowledgement
3. The LC 20 will upon reception of the Availability Notification message check the consistency of the information provided and if successful respond with an Availability Notification Message Ack message to confirm the reception of new spectrum resource availability information to the LR 10.
4. Upon successful configuration of the spectrum resources LC 20 will send an Availability Notification Ack message to the LR 10 to confirm changes to the MFCN.

As part of step 1 in the above signaling steps, the rules for safe mode handling may be addressed (e.g., communicated).

It is the responsibility of the LSA Resource Information Processing function 12 of the LR 10 to monitor the expiry information of the Sharing Framework, but on the other hand it is the responsibility of the LC 20 to enforce the regulatory and incumbent restrictions. Persistent communication and data exchange via $LSA_1$ 30 facilitate the fulfillment of these responsibilities. But by communicating a safe mode fallback plan that may be used if communication fails, a full de-activation of sharing cells is avoided when a communication failure occurs.

Figure 4:
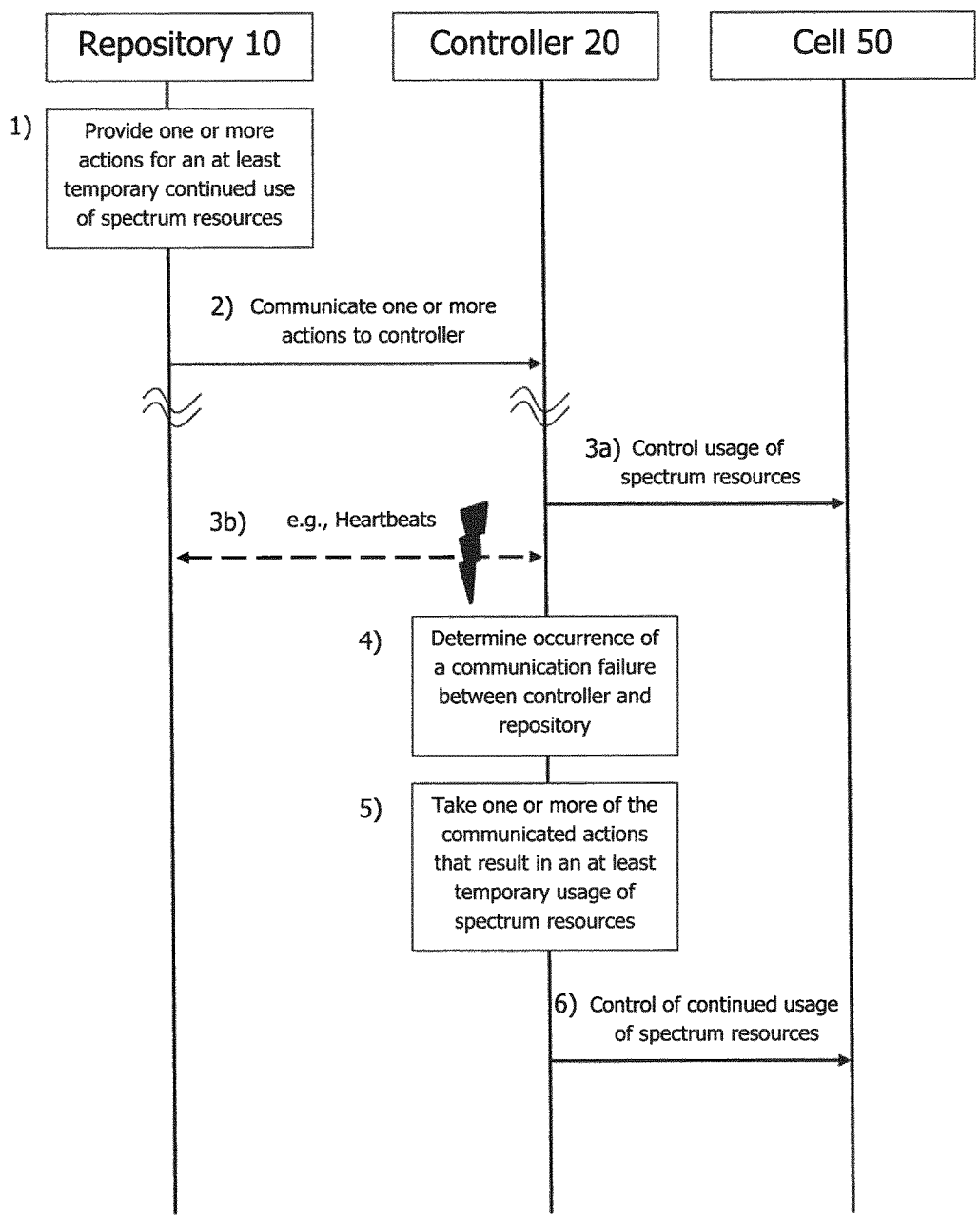
FIG. 4 is a flowchart of exemplary method aspects performed by a repository and a controller in connection with enhancing service continuity.

FIG. 4 illustrates another example for enhancing service continuity in the case of a communication failure between a repository 10 (such as the LR shown in FIGS. 1 to and 3) and a controller (such as the LC 20 in FIGS. 1 to 3) of a spectrum sharing communication system. It will, of course, be appreciated that the example illustrated in FIG. 4 as well as the previous examples are not limited to be implemented in connection with the LSA framework. It will further be appreciated that the various examples presented herein could be combined as needed.

The components of the spectrum sharing communication system illustrated in FIG. 4 comprise, in addition to the repository 10 and the controller 20, one or more cells 50 of a cellular communication system (e.g., GERAN, UTRAN, E-UTRAN, WiFi, etc.). The one or more cells 50 are configured to provide services to one or more user terminals (not shown in FIG. 4) as generally known in the art. These services are provided using shared spectrum resources under control of use restrictions enforced by the controller 50. The corresponding control operations may, for example, be compliant with the LSA or any other standard(s).

The repository 10 is generally operable to at least one of store and generate the restrictions governing use of a set of shared spectrum resources. The controller 20, in turn, is generally operable to receive the restrictions from the repository and to enforce the restrictions. Enforcement of the restrictions by the controller 20 results in the controlled usage of the shared spectrum resources by the one or more cells 50. The restrictions governing the use of the set of shared spectrum resources may have been communicated from the repository 10 to the controller 20 prior to the individual steps illustrated in FIG. 4 or in connection with one or more of the steps illustrated in FIG. 4.

As shown in FIG. 4, the repository 10 in a first step of the procedure illustrated in FIG. 4 provides one or more actions for an at least temporary continued use of shared spectrum resources under control of the controller 20 upon occurrence of a communication failure between the repository 10 and the controller 20. In certain variants, the actions provided in the initial step may be different from the general restrictions governing general use of the shared spectrum resources. In other variants, the actions may be part of and communicated together with these restrictions.

Provision of the one or more actions in the initial step by repository 10 may comprise receiving and/or storing the actions by the repository 10. The actions may, for example, be received via an operator setting or otherwise.

In one implementation, the one or more actions define the at least temporary continued use of the shared spectrum resources such that the one or more cells 50 providing the service are maintained at least temporarily active by the controller 20. As an example, the shared spectrum resources may be assigned for use by the one or more cells 50 on a permanent basis or at least for a predefined amount of time.

In a second step, the repository 10 communicates the one or more actions to the controller 20. In some implementations, the one or more actions are communicated to the controller 20 as illustrated in FIG. 2 or 3 (e.g., as part of a safe mode fallback plan). It will be appreciated that the communication of the one or more actions to the controller 20 may be performed at any time and in particular prior to the actual usage of the shared spectrum resources. However, in alternative implementations the one or more actions may also be communicated during usage of the shared spectrum resources.

As further illustrated in FIG. 4, the controller 20 is configured to control usage of the shared spectrum resources by the one or more cells 50 in accordance with the restrictions received from the repository. As such, usage control in the third step of FIG. 4 may comprise enforcing the corresponding restrictions as received from the repository 10.

While the controller 20 controls the usage of the shared spectrum resources it continuously checks the communication connection towards the repository 10. In a similar manner, the repository 10 may continuously check itself the communication in connection with the controller 20.

Checking of the communication connection (such as the LSA$_1$ interface) may be performed in various ways. The communication connection may, for example, be checked by communicating so-called heartbeats (e.g., "ping" signals) in regular intervals between the repository 10 and the controller 20 (or, alternatively, only from one of these two entities to the other).

If no heartbeat is received over a predefined period of time as indicated by a flash in FIG. 4, one or both of the repository 10 and the controller 20 may conclude that there exists a communication failure between the repository 10 and the controller 20 as illustrated for the controller 10 in the fourth step in FIG. 4. Of course, occurrence of a communication failure may also be determined otherwise, such as by receipt of a failure message by the controller 20 from a supervising entity not illustrated in FIG. 4.

In response to determining occurrence of a communication failure in the fourth step, the controller 20 in a fifth step takes one or more of the communicated actions. As explained above, taking one or more of these actions will result in an at least temporary continued use of the shared spectrum resources under control of the controller (e.g., in accordance with the currently valid use restrictions). As such, the controller 20 will, in response to the determined communication failure, in a sixth step control the one or more cells 50 to permit then the continued usage of the shared spectrum resources. As a result, service continuity from the perspective of one or more user terminals served by the one or more cells 50 will be enhanced at least temporarily.

Specifically, instead of controlling the one or more cells 50 to immediately stop usage of the shared spectrum resources in response to determination of a communication failure, the controller 20 may maintain the one or more cells 50 operable for an at least limited amount of time or, alternatively, on a permanent basis. As understood in connection with the example of FIG. 4, the term "permanent" means that the controller 20 itself cannot foresee any point in time for stopping usage of the shared spectrum resources (although the usage may, of course, be stopped upon an operator intervention or otherwise).

In one variant the action taken in the fifth step of FIG. 4 additionally or alternatively includes starting a timer that allows for a failure recovery hysteresis before stopping usage of the shared spectrum resources. As such, usage control of the shared spectrum resources by the controller 20 will continue in accordance with the general restrictions that govern use of the shared spectrum resources in case the communication failure no longer occurs at expiry of the timer. Should, on the other hand, the communication failure persist, usage of the shared spectrum resources by the one or more cells 50 may be stopped. As an example, the one or more cells 50 providing a particular service may be de-activated.

An alternative or additional action that may be taken in connection with the occurrence of a communication failure includes a power reduction. Specifically, the transmit power of the one or more cells 50 may be reduced stepwise or continuously over a predefined period of time so as to result in a more "graceful" service discontinuation from the perspective of the one or more user terminals served by the one or more cells 50.

In the following, further examples of the present disclosure will be presented that can be combined with, or that summarize, any of the examples presented above.

According to a first example, a spectrum sharing communication system comprises: a spectrum sharing repository operable to generate and/or store restrictions governing use of a set of shared spectrum resources, and a spectrum sharing controller operable to receive the restrictions from the spectrum sharing repository and to enforce the restrictions in the spectrum sharing communication system. The spectrum sharing repository and the spectrum sharing controller are further operable to communicate a safe mode fallback plan for use in response to a failure of a communication interface between the spectrum sharing repository and the spectrum sharing controller.

In an aspect of the first example, the safe mode fallback plan is communicated as a set of rules valid for a certain time period.

In another aspect of the first example, the rules include rules for use of resources that are assigned on a permanent basis, a reduction in power to be used in case of failure, and/or providing a timer that may allow for a certain recovery hysteresis before de-activation of cells in the spectrum sharing communication system.

In another aspect of the first example, the safe mode fallback plan is pulled by the spectrum sharing controller. For example, the safe mode fallback plan is communicated as part of an Availability Request Procedure.

In another aspect of the first example, the safe mode fallback plan is pushed by the spectrum sharing repository. For example, the safe mode fallback plan is communicated as part of an Availability Notification Procedure.

According to a second example, a method for managing a spectrum sharing communication system comprises: generating and/or storing restrictions governing use of a set of shared spectrum resources at a spectrum sharing repository, receiving the restrictions from the spectrum sharing repository at a spectrum sharing controller and, at the spectrum sharing controller, enforcing the restrictions in the spectrum sharing communication system. The method further includes communicating a safe mode fallback plan for use in response to a failure of a communication interface between the spectrum sharing repository and the spectrum sharing controller.

In an aspect of the second example, the safe mode fallback plan is communicated as a set of rules valid for a certain time period.

In another aspect of the second example, the rules include rules for use of resources that are assigned on a permanent basis, a reduction in power to be used in case of failure, and/or providing a timer that may allow for a certain recovery hysteresis before de-activation of cells in the spectrum sharing communication system.

In another aspect of the second example, the spectrum sharing controller pulls the safe mode fallback plan from the spectrum sharing repository. For example, the safe mode fallback plan is communicated as part of an Availability Request Procedure.

In another aspect of the second example, the spectrum sharing repository pushes the safe mode fallback plan to the spectrum sharing controller. For example, the safe mode fallback plan is communicated as part of an Availability Notification Procedure.

According to a third example, a computer-readable medium includes instructions that, when executed by one or more processors of a spectrum sharing repository in a spectrum sharing communication system comprising the spectrum sharing repository and a spectrum sharing controller, cause the spectrum sharing repository to generate and/or store restrictions governing use of a set of shared spectrum resources, send the restrictions to the spectrum sharing controller for enforcement in the spectrum sharing communication system, and communicate a safe mode fallback plan to the spectrum sharing controller for use in response to a failure of a communication interface between the spectrum sharing repository and the spectrum sharing controller.

According to a fourth example, a computer-readable medium includes instructions that, when executed by one or more processors of a spectrum sharing controller in a spectrum sharing communication system comprising the spectrum sharing controller and a spectrum sharing repository, cause the spectrum sharing controller enforce restrictions governing use of a set of shared spectrum resources in the spectrum sharing communication system, and receive a safe mode fallback plan from the spectrum sharing repository for use in response to a failure of a communication interface between the spectrum sharing repository and the spectrum sharing controller.

Many advantages of the present invention will be fully understood from the foregoing description, and it will be apparent that various changes may be made in the form, construction and arrangement of the services, functions, steps, devices and nodes presented herein without departing from the scope of the invention or without sacrificing all of its advantages. Since the invention can be varied in many ways, it will be appreciated that the invention should be limited only by the scope of the claims that follow.

The invention claimed is:

1. A method for enhancing service continuity in the case of a communication failure between a repository and a controller of a spectrum sharing communication system, wherein the repository is operable to at least one of store and generate restrictions governing use of a set of shared spectrum resources and the controller is operable to receive the restrictions from the repository and enforce the restrictions, the method comprising:
   determining, by the controller, occurrence of a communication failure between the repository and the controller by using a heartbeat procedure, the heartbeat procedure comprising monitoring reception of heartbeat messages in regular time intervals; and
   in response to the communication failure, taking, by the controller, one or more actions that result in an at least temporary continued use of shared spectrum resources under control of the controller, wherein the one or more actions comprise providing a timer that allows for a failure recovery hysteresis before stopping usage of the shared spectrum resources, wherein the one or more actions are defined in a safe mode fallback plan received from the repository.

2. The method of claim 1, wherein the at least temporary continued use of the shared spectrum resources comprises maintaining a cell providing the service at least temporarily active by the controller.

3. The method of claim 1, wherein the one or more actions relate to an assignment of the shared spectrum resources for use on a permanent basis.

4. The method of claim 1, wherein stopping usage of the shared spectrum resources comprises deactivating one or more cells providing the service.

5. The method of claim 1, wherein the one or more actions include a power reduction.

6. The method of claim 1, wherein the one or more actions are only taken in response to the communication failure lasting more than a threshold amount of time.

7. The method of claim 1, wherein the one or more actions are entered as configuration information in the controller.

8. The method of claim 1, wherein the one or more actions are passed by a message from the repository to the controller.

9. The method of claim 1, wherein the one or more actions are defined as part of a sharing framework.

10. The method of claim 1, wherein the safe mode fallback plan is pulled by the controller from the repository.

11. The method of claim 1, wherein the safe mode fallback plan is pushed by the repository to the controller.

12. The method of claim 1, wherein the actions in the safe mode fallback plan are valid for a certain period of time.

13. The method of claim 1, wherein the communication failure is a failure of a communication interface between the repository and the controller.

14. A method for enhancing service continuity in the case of a communication failure between a repository and a controller of a spectrum sharing communication system, wherein the repository is operable to at least one of store and generate restrictions governing use of a set of shared spectrum resources and the controller is operable to receive the restrictions from the repository and enforce the restrictions, the method comprising:
providing, by the repository, one or more actions that result in an at least temporary continued use of spectrum resources under control of the controller upon occurrence of a communication failure between the repository and the controller by using a heartbeat procedure, the heartbeat procedure comprising monitoring reception of heartbeat messages in regular time intervals; and
communicating, by the repository, the one or more actions to the controller, wherein the one or more actions comprise providing a timer that allows for a failure recovery hysteresis before stopping usage of the shared spectrum resources, wherein the one or more actions are defined in a safe mode fallback plan received from the repository.

15. The method of claim 14, wherein the one or more actions are communicated to the controller in a safe mode fallback plan.

16. The method of claim 15, wherein the safe mode fallback plan is pulled by the controller.

17. The method of claim 15, wherein the safe mode fallback plan is pushed to the controller.

18. A non-transitory computer readable recording medium storing a computer program product for enhancing service continuity in the case of a communication failure between a repository and a controller of a spectrum sharing communication system, wherein the repository is operable to at least one of store and generate restrictions governing use of a set of shared spectrum resources and the controller is operable to receive the restrictions from the repository and enforce the restrictions, the computer program product comprising software instructions which, when run on processing circuitry of the controller entity, causes the controller to perform operations comprising:
determining, by the controller, occurrence of a communication failure between the repository and the controller by using a heartbeat procedure, the heartbeat procedure comprising monitoring reception of heartbeat messages in regular time intervals; and
in response to the communication failure, taking, by the controller, one or more actions that result in an at least temporary continued use of shared spectrum resources under control of the controller, wherein the one or more actions comprise providing a timer that allows for a failure recovery hysteresis before stopping usage of the shared spectrum resources, wherein the one or more actions are defined in a safe mode fallback plan received from the repository.

19. A non-transitory computer readable recording medium storing a computer program product for enhancing service continuity in the case of a communication failure between a repository and a controller of a spectrum sharing communication system, wherein the repository is operable to at least one of store and generate restrictions governing use of a set of shared spectrum resources and the controller is operable to receive the restrictions from the repository and enforce the restrictions, the computer program product comprising software instructions which, when run on processing circuitry of the repository, causes the repository to perform operations comprising:
providing one or more actions that result in an at least temporary continued use of spectrum resources under control of the controller upon occurrence of a communication failure between the repository and the controller by using a heartbeat procedure, the heartbeat procedure comprising monitoring reception of heartbeat messages in regular time intervals; and
communicating the one or more actions to the controller, wherein the one or more actions comprise providing a timer that allows for a failure recovery hysteresis before stopping usage of the shared spectrum resources, wherein the one or more actions are defined in a safe mode fallback plan communicated by the repository.

20. A controller for enhancing service continuity in the case of a communication failure between a repository and the controller in a spectrum sharing communication system, wherein the controller is operable to receive from the repository restrictions governing use of a set of shared spectrum resources and to enforce the restrictions, the controller comprising:
processing circuitry;
memory containing instructions executable by the processing circuitry whereby the controller is operative to:
determine occurrence of a communication failure between the repository and the controller by using a heartbeat procedure, the heartbeat procedure comprising monitoring reception of heartbeat messages in regular time intervals; and
in response to the communication failure, take one or more actions that result in an at least temporary continued use of shared spectrum resources under control of the controller, wherein the one or more actions comprise providing a timer that allows for a failure recovery hysteresis before stopping usage of the shared spectrum resources, wherein the one or more actions are defined in a safe mode fallback plan received from the repository.

21. The controller of claim 20, wherein the at least temporary continued use of the shared spectrum resources comprises maintaining a cell providing the service at least temporarily active by the controller.

22. The controller of claim 20, wherein the one or more actions relate to an assignment of the shared spectrum resources for use on a permanent basis.

23. The controller of claim 20, wherein stopping usage of the shared spectrum resources comprises de-activating one or more cells providing the service.

24. The controller of claim 20, wherein the one or more actions include a power reduction.

25. The controller of claim 20, wherein the one or more actions are only taken in response to the communication failure lasting more than a threshold amount of time.

26. The controller of claim 20, wherein the one or more actions are entered as configuration information in the controller.

27. The controller of claim 20, wherein the one or more actions are received by a message from the repository to the controller.

28. The controller of claim 20, wherein the one or more actions are defined as part of a sharing framework.

29. The controller of claim 20:
wherein the one or more actions are defined as part of a sharing framework;
wherein the one or more actions are defined in a safe mode fallback plan received from the repository;
wherein the safe mode fallback plan is pulled by the controller from the repository.

30. The controller of claim 20:
wherein the one or more actions are defined as part of a sharing framework;
wherein the one or more actions are defined in a safe mode fallback plan received from the repository;
wherein the safe mode fallback plan is pushed by the repository to the controller.

31. The controller of claim 20, wherein the actions in the safe mode fallback plan are valid for a certain period of time.

32. The controller of claim 20, wherein the communication failure is a failure of a communication interface between the repository and the controller.

33. A repository for enhancing service continuity in the case of a communication failure between the repository and a controller in a spectrum sharing communication system, wherein the repository is operable to at least one of store and generate restrictions governing use of a set of shared spectrum resources for enforcement by the controller, the repository comprising:
processing circuitry;
memory containing instructions executable by the processing circuitry whereby the repository is operative to:
provide one or more actions that result in an at least temporary continued use of shared spectrum resources under control of the controller upon occurrence of a communication failure between the repository and the controller by using a heartbeat procedure, the heartbeat procedure comprising monitoring reception of heartbeat messages in regular time intervals; and
communicate the one or more actions to the controller, wherein the one or more actions comprise providing a timer that allows for a failure recovery hysteresis before stopping usage of the shared spectrum resources, wherein the one or more actions are defined in a safe mode fallback plan communicated by the repository.

34. The repository of claim 33, wherein the one or more actions are communicated to the controller in a safe mode fallback plan.

35. The repository of claim 34, wherein the safe mode fallback plan is pulled by the controller.

36. The repository of claim 34, wherein the safe mode fallback plan is pushed to the controller.

37. A spectrum sharing communication system, comprising:
a controller the controller for enhancing service continuity in the case of a communication failure between a repository and the controller in the spectrum sharing communication system, wherein the controller is operable to receive from the repository restrictions governing use of a set of shared spectrum resources and to enforce the restrictions;
the repository; the repository operable to at least one of store and generate restrictions governing use of a set of shared spectrum resources for enforcement by the controller;
wherein the controller comprises first processing circuitry and first memory containing instructions executable by the first processing circuitry whereby the controller is operative to:
determine occurrence of a communication failure between the repository and the controller by using a heartbeat procedure, the heartbeat procedure comprising monitoring reception of heartbeat messages in regular time intervals; and
in response to the communication failure, take one or more actions that result in an at least temporary continued use of shared spectrum resources under control of the controller, wherein the one or more actions comprise providing a timer that allows for a failure recovery hysteresis before stopping usage of the shared spectrum resources, wherein the one or more actions are defined in a safe mode fallback plan received from the repository,
wherein the repository comprises second processing circuitry and second memory containing instructions executable by the second processing circuitry whereby the repository is operative to:
provide one or more actions that result in an at least temporary continued use of shared spectrum resources under control of the controller upon occurrence of a communication failure between the repository and the controller by using a heartbeat procedure, the heartbeat procedure comprising monitoring reception of heartbeat messages in regular time intervals; and
communicate the one or more actions to the controller.

* * * * *